US005092816A

United States Patent [19]

Levasseur

[11] Patent Number: 5,092,816

[45] Date of Patent: Mar. 3, 1992

[54] COIN TUBE MONITOR AND CONTROL MEANS

[75] Inventor: Joseph L. Levasseur, St. Louis, Mo.

[73] Assignee: Coin Acceptors, Inc., St. Louis, Mo.

[21] Appl. No.: 587,983

[22] Filed: Sep. 25, 1990

[51] Int. Cl.[5] .......... G01S 3/80; G07D 9/04

[52] U.S. Cl. .......... 453/17; 367/127; 367/908

[58] Field of Search .......... 453/16, 17; 367/127, 367/908; 73/572, 587

[56] References Cited

U.S. PATENT DOCUMENTS

| | | | |
|---|---|---|---|
| 4,003,017 | 1/1977 | Bailey | 367/127 X |
| 4,092,990 | 6/1978 | Bayne | 453/55 |
| 4,491,140 | 1/1985 | Eglise et al. | 453/32 X |
| 4,587,984 | 5/1986 | Levasseur et al. | 453/17 |
| 4,774,841 | 10/1988 | Chadwick | 453/17 X |

FOREIGN PATENT DOCUMENTS

| | | | |
|---|---|---|---|
| 3802121 | 8/1989 | Fed. Rep. of Germany | 453/17 |

*Primary Examiner*—F. J. Bartuska

*Attorney, Agent, or Firm*—Haverstock, Garrett & Roberts

[57] ABSTRACT

A coin tube monitor and control device for monitoring and controlling the number of coins in a coin tube by determining the time between when a coin enters a coin tube and when it strikes the stack of coins that has accumulated therein. The device includes an acoustic sensor for responding to certain movements of the coins.

26 Claims, 3 Drawing Sheets

COIN TUBE MONITOR AND CONTROL MEANS

BACKGROUND OF THE INVENTION

The present invention relates to a device for monitoring the coinage in coin tubes and more particularly to a device that uses acoustical means to sense certain coin movements in the monitoring of coinage in coin tubes to determine the number of coins in the coin tubes and to control where newly deposited coins are directed.

Many devices are in existence for monitoring the coinage in coin tubes to determine and control the number of coins remaining in coin tubes for making change and refunds from vending machines and for maintaining minimum numbers of coins in the tubes. For the most part, the known coin tube control and monitoring devices have included mechanical devices such as mechanical coin sensors or feelers which sense the presence of coins in the coin tubes, electric switches, optical devices, inductors, and Hall effect sensors which physically, electrically, optically, or magnetically sense the presence of coins in the coin tubes. Such devices typically operate on a go or no go basis in sensing the coins and/or the number of coins in a coin tube by the condition of the feeler or switch, or the presence or absence of a light beam, or the condition of a Hall effect device. Such devices have been used to determine if a coin tube has enough coins in it to be able to be operated to payout change to a customer. Some of these devices are located at the top, the bottom or at an intermediate location along the coin tube to sense the presence of coins. Additionally, those devices that use a sensor located at an intermediate location along the coin tube are used to limit the self-loading of the coin tube above the intermediate level. Mechanical feelers, switches, optical sensors, inductors, and Hall effect devices have obvious disadvantages and limitations including being subject to breaking, failing, sticking and interfering with coin movements. These devices are also relatively expensive and are slow acting as compared to electronic circuit devices and they are relatively susceptible to jamming and require frequent maintenance and repair. All of these conditions and limitations of the known monitoring devices limit their usefulness, cause relatively frequent repair and maintenance, and increase the cost of operating and maintaining the coin tubes, and particularly the coin tubes used for making change in a vending machine. Since the coin tubes in a vending machine are the usual means chosen for coins to be accumulated for payback it is important that the coin tubes be as clear and open as possible and free from maintenance and jamming. It is also important to know how many coins are in the coin tubes at all times in order to determine whether a deposited coin should be sent to one of the coin tubes or to a cash box.

One such device for monitoring the coinage in coin tubes is disclosed in U.S. Pat. No. 4,587,984, which is assigned to a subsidiary of the assignee of this invention. This device maintains a running total of the number of coins in one or more coin tubes by adding and substracting coins to establish an amount to be maintained which is predetermined. In order for this device to perform properly the predetermined number of coins store in each coin tube must be known. Data produced from other vending control means as a result of deposits made, coins paid back or refunded, and the difference between the number of coins deposited that are directed into the coin tubes and the number of coins that are passed to the cash box are used to determine the number of coins remaining in the coin tubes. A predetermined maximum and predetermined minimum number of coins to be accumulated in each of the coin tubes are also used to direct coins to a suitable location in the vending machine.

Another device for monitoring the coinage in coin tubes is shown in U.S. Pat. No. 4,491,140 whereby only one level of each coin tube is sensed to provide correction to the running total whenever its predetermined level detector indicates a change. This device maintains a running estimated count of the coins in a coin tube. This device also includes a sensor which determines whether the number of coins in the coin tube is greater than a predetermined number. If the number of coins in the coin tube is greater than the predetermined number the running estimated count is modified.

Various limitations of the prior art devices can be seen when considering the use of coin tubes having increased heights and numbers which result in increased storage capacities. It is desirable to provide flexability of coin tube maximum and minimum amounts as the requirements for making change varies from one sale price situation to another, and with the acceptance of certain coins and bill demoninations, i.e., unless the largest demomination coin is required, for making change if accepting higher denomination currency. Additionally, as the number of coin tubes increases due to differing requirements of vending machines, the prior art devices have to be modified to add more circuitry, especially replicative circuitry.

OBJECTS OF THE PRESENT INVENTION

It is a principal object of the present invention to teach the construction and operation of novel means to monitor and control the number of coins in one or more coin tubes.

Another important object is to sense coin movements in a coin tube by acoustic means which sense certain movements or impacts made by the coins as they enter the coin tubes and as they impact on coins in the tubes.

Another object is to acoustically sense more than one coin movement of a coin in a coin tube using the same acoustical sensing means.

Another object is to provide improved means for maintaining a desired level or number of coins in a coin tube.

Another object is to know the number of coins remaining in a coin tube without having to sense or feel the coins in the coin tube.

Another object is to provide means to electronically monitor and control the number of coins available for payout or refund in each coin tube in a vending machine.

Another object is to provide means to monitor and control the number of coins in one or more coin tubes with minimal replicative circuitry.

Another object is to reduce maintenance on vending and other coin controlled devices.

Another object is to simplify the construction of the coin tubes used in vending machines.

Another object is to reduce the possibility of a coin jam in the coin tubes used in vending machines.

Another object is to provide improved coin tube monitoring and control means which are compatible with existing vending control circuits.

These and other objects and advantages of the present invention will become apparent after considering the following detailed specification of a preferred embodiment of the subject invention in conjunction with the accompanying drawings wherein:

DETAILED DESCRIPTION OF THE PREFERRED EMBODIMENT

Figure 1:
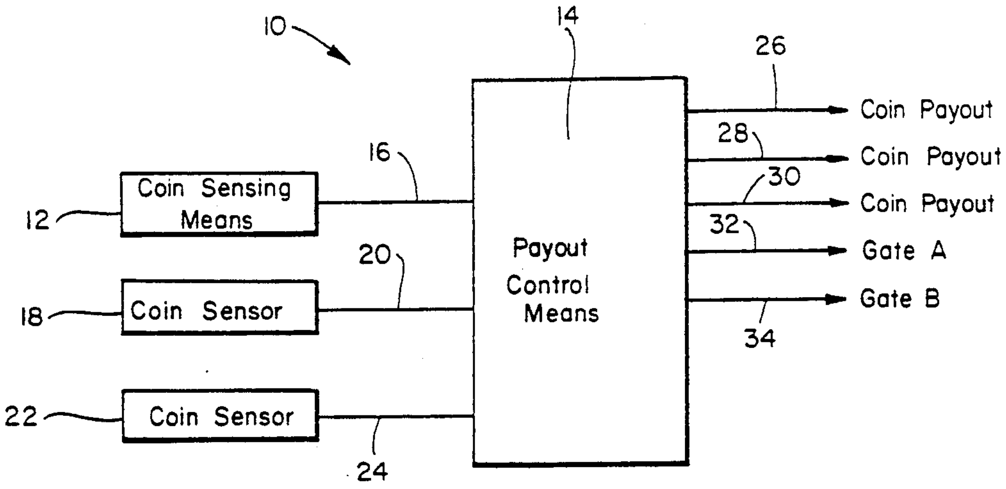
FIG. 1 is a block diagram showing the circuitry for coin tube monitoring and control means constructed according to the present invention.

Referring to the drawings more particularly by reference numbers, number 10 in FIG. 1 refers to a coin tube monitor and control circuit for use on a vending control device that includes coin tubes for accumulating coins to be used for payback, refund, and escrow. The circuit 10 including the coin tubes associated therewith, is constructed and connected according to a preferred embodiment of the present invention and many of the circuit elements can be embodied in a microprocessor or like device. The circuit 10 is shown for illustrative purposes having provision for recognizing, accumulating, and monitoring three different denominations of coins, i.e. nickels, dimes and quarters, and for generating signals to represent each different denomination of coin deposited and certain movements thereof. For example, the circuit includes a coin sensing means 12 that is used for sensing data from which the acceptability, validity and denomination of each deposited coin can be determined. Such devices are well known and are not per se a part of the present invention. The coin sensing means 12 are connected to a payout control means 14 by lead 16. A signal is sent over lead 16 by the coin sensing means 12 to the payout control means or microprocessor 14 whenever it is established that a genuine or authentic coin has been deposited. Additionally, the coin sensing means 12 produces a signal representative of the denomination of the deposited coin to the payout control means 14 over lead 16 when the denomination of the coin has been determined. The number of coins and coin tubes employed will vary depending on the requirements of each coin changer, and the circuit 10 can be made to accommodate a greater or a lesser number of different denomination coins.

The circuit 10 also includes another coin sensor 18 which is connected to the payout control means 14 via lead 20. The coin sensor 18 is shown as being an optical detector which optically detects the passing of a deposited coin into a coin tube. Although only one coin sensor 18 is shown in FIG. 1, it is to be understood that one such coin sensor 18 is associated with each coin tube.

The circuit 10 includes still another coin sensor 22 connected to the payout control means 14 via lead 24. The coin sensor 22 in the present construction is an acoustic sensor that detects certain sounds or frequencies produced by a deposited coin when it impacts on various elements along its path of movement. The sensor 22 can be made to respond to a range of frequencies that includes the frequency of the coins vibration on impact.

The payout control means or microprocessor 14 has various output connections such as those appearing leads 26, 28, and 30, and these are connected to respective payout motors or solenoids (not shown) associated with the different denomination coin tubes wherein coins are accumulated for payback. For example, each time a signal is present on the lead 26, its associated payback motor or solenoid will be energized to pay back one quarter coin from the quarter coin tube. Likewise, when a signal is present on lead 28, a motor or solenoid will be energized to pay back a nickel coin from the nickel coin tube, and when a signal is present on lead 30 a motor or solenoid will be energized to pay back a dime coin from the dime coin tube.

Figure 2:
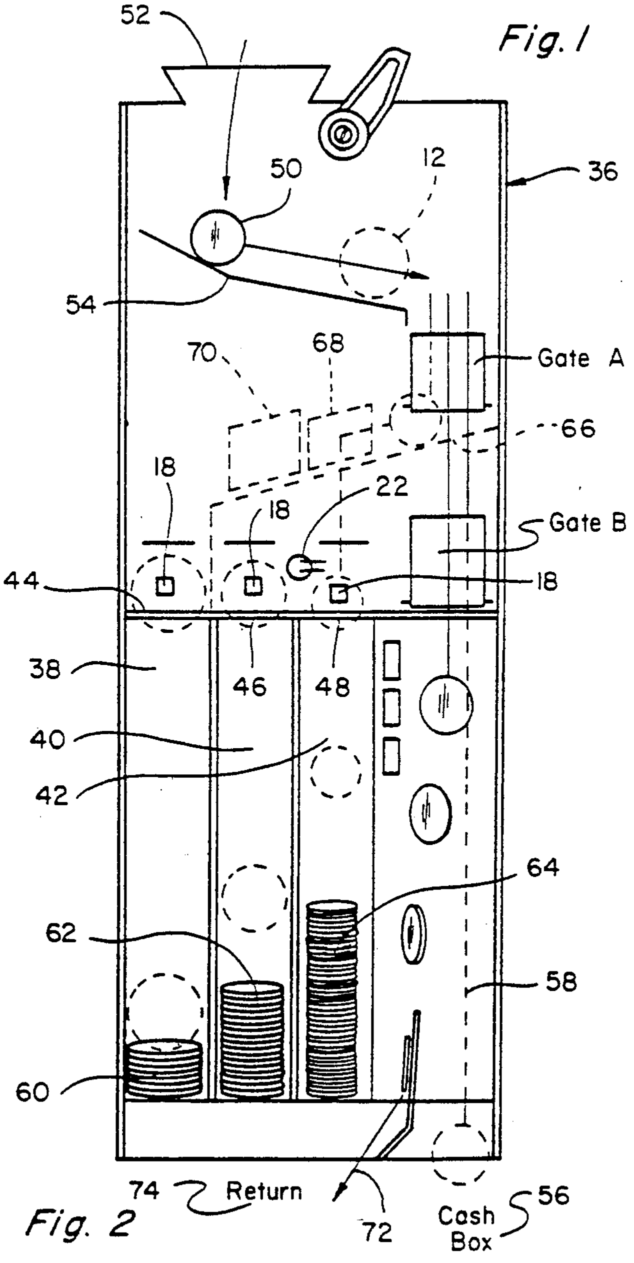
FIG. 2 is a perspective view of a set of coin tubes for use with a vending machine equipped with the present invention.

The payout control means 14 has two other output connections on leads 32 and 34 which are connected to the controls for a gate A and a gate B, respectively, both of the gates being shown in FIG. 2. The gates are operated to open and close depending upon whether an authentic coin has been sensed by the coin sensing means 12 and whether the coin tubes are at capacity or have accumulated at least a predetermined maximum number of coins. For example, the control for gate A will be operated to direct or prevent an authentic deposited coin from entering the respective denomination coin tube, and gate B will be operated to direct or prevent an authentic deposited coin from going to another location in a vending machine such as a cash box.

FIG. 2 shows an arrangement of a coin changer 36 that includes coin tubes 38, 40, and 42 for use in a vending machine or like device. The coin tubes 38, 40, and 42 are for receiving quarters, nickels, and dimes and each has means or an opening 44, 46, and 48 located at its respective upper end for receiving and directing coins into the coin tubes 38, 40, and 42. Each of the coin tubes 38, 40, and 42 also has means at its lower end operable by a respective motor or solenoid to discharge one or more coins at a time for payback or refund purposes in response to a signal sent over line 26, 28, or 30.

A coin 50 is shown deposited through an inlet 52 to the changer and rolls down an upper incline surface 54 past the coin sensing means 12. Coin sensing means 12 is connected to circuit means that determine whether the deposited coin 50 is acceptable or genuine and what denomination it is. This information is sent to the payout control means 14. If the coin 50 is genuine and acceptable the payout control means 14 will operate to control where the coin should be sent such as to one of the coin tubes 38, 40, and 42 or to a cash box 56. If the payout control means 14 determines that the coin 50 should be sent to one of the coin tubes 38, 40, and 42 a signal is sent over the lead 32 to operate or open gate A. When the payout control means 14 decides that the coin 50 should be sent to the cash box 56 a signal is sent over lead 34 to operate or open gate B so that the coin 50 is directed along a path indicated by arrow 58 to the cash box 56.

Each of the coin tubes 38, 40, and 42 is shown containing a stack of coins which are stored for subsequent payout or refund to a customer. Coin tube 38 contains a stack 60 of quarters, coin tube 40 contains a stack 62 of nickels, and coin tube 42 contains a stack 64 of dimes.

If it is determined by the means 14 that the deposited coin 50 should be directed through gate A then the deposited coin 50 passes through gate A and is directed to the appropriate one of the coin tubes 38, 40, and 42 moving along another inclined path 66. Depending upon the denomination and more specifically the diameter of the deposited coin 50 it will be directed into the appropriate one of the coin tubes 38, 40, and 42. A dime will fit through opening 68 and be directed to the opening 48 of dime coin tube 42. A nickel will fit through an opening 70 and be directed to the opening 46 of nickel coin tube 40 and quarter coins will not fit through either of the openings 68 and 70 and will instead be directed to the opening 44 at the top of the quarter coin tube 38. The arrival of the coin 50 just prior to entering one of the coin tubes 38, 40, and 42 is detected by the respective optical coin sensor 18. This arrival time or the leading edge thereof is designated time T1 and is important to this invention. The detected arrival of the coin 50 by the coin sensor 18 is supplied to the payout control means 14 which thereafter immediately sends a signal over lead 34 to cause the gate A to close to prevent a succeeding coin from passing. The coin 50 that has entered the upper end of the appropriate coin tube descends down the respective coin tube 38, 40, and 42 and in so doing will impact the stack of coins 60, 62, or 64 therein resulting in the production of a sound or noise which is detected by the acoustic coin sensor 22. Time T2 is the time it takes for a quarter coin 50 to pass through opening 44 at the upper end of the quarter coin tube 38 to fall down the coin tube and strike the stack of quarters 60 and hence to produce the impact sound or noise which can then be detected by sensor means. Time T3 is the time it takes for a nickel coin 50 to pass through opening 46 and t fall down the nickel coin tube 40 and strike the stack 62 of nickels and time T4 is the time it takes a dime coin 50 to pass through opening 48 in the dime coin 42 tube and fall and strike the stack 64 of dimes. The times T1, T2, T3, and T4 are utilized by the payout control means 14 to determine the number of coins presently accumulated in each of the coin tubes 38, 40, and 42.

When gate A has been opened it is necessary to reclose it as soon as the accepted coin 50 has passed through in order to prevent a subsequent coin from entering and passing due to the payout control means 14 deciding that the subsequent coin should be directed elsewhere. When gate B is opened it is also necessary to close it as soon as an accepted coin 50 has passed through in order to prevent a subsequent coin from entering due to the payout control means 14 deciding that the subsequent coin should be directed to a coin tube or to a coin return mechanism 72 along an alternate coin return path 74.

The payout control mean 14 also includes coin accumulators or counters (not shown) associated with each of the coin tubes 38, 40, and 42 wherein quarter, nickel, and dime coins are accumulated for use in making change or paying back overdeposits. The accumulators keep running totals of the numbers of coins in the respective coin tubes 38, 40, and 42. The payout control means 14 further includes a memory (not shown) for storing a predetermined maximum and a predetermined minimum number of coins to be accumulated in each of the coin tubes 38, 40, and 42. The payout control means 14 operates to open the gate B when a coin is deposited at a time when the number of coins accumulated in the corresponding coin tube for that coin denomination equals or exceeds the predetermined stored maximum number of coins for that particular coin tube. The payout control means 14 also includes means which operate to inhibit the payout of coins from a particular coin tube when the coin tube has a number of coins therein that is equal to or less than the predetermined minimum number of coins as stored in memory. This is so that coins are paid out or refunded only when there are at least the predetermined minimum number of coins present in the respective coin tubes. For example, if the number of nickel coins remaining in the nickel coin tube 40, as represented by the accumulator which stores this number, falls below the predetermined minimums of coins, then a signal would not be Present on the nickel output 28 of the control means 14 and nickel coins will not be paid out. The same is true for the other coin tubes and their associated accumulators. It is important to know whether coins of a particular denomination are available for payout or whether payout should be made only from coin tubes of other denominations.

Figure 3:
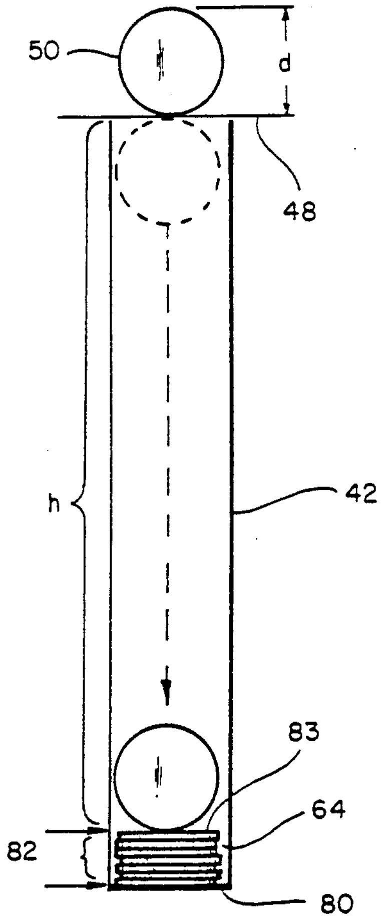
FIG. 3 is a perspective view of one of the coin tubes shown in FIG. 2.

FIG. 3 illustrates the dime coin tube 42 during movement of a dime coin 50 from the time it enters the coin tube 42 until it strikes the top coin in the stack 64 of coins that has accumulated therein. The dime coin 50 has a known diameter d which is small enough to be able to pass through the coin tube inlet opening 48 and enter the coin tube 42. The stack 64 of dimes in the coin tube has a height 82 represented by the upper surface 83 of the upper coin in the stacks that is a predetermined distance above the base or bottom 80 of the tube. The distance between the top 83 of the uppermost coin 50 in the stack 64 to the inlet opening 48 is the distance h. The entry velocity of the dime coin 50 is also important to know and this can be determined by measuring the time it takes for the coin 50 to pass through the inlet opening 48. This can be determined or measured by the optical sensor 18 which measures or sees the coin as it passes and determines the time it takes for the coin 50 to pass through the opening 48. The time it takes for the coin 50 to pass through opening 48 (or past the sensor 18) and until it strikes the upper surface 83 of the stack 64 is determined by sensing the time when the impact is made by the coin striking the stack 64. By measuring the time between when the coin enters the coin tube, taking into account its entry velocity, and the time it impacts on the stack 64 taking into account or more likely ignoring the time from when the coin strikes the stack until the noise is sensed is a precise time duration that can be used to determine the height of the stack 64 and hence the number of coins (dimes) in the stack. If a coin tumbles as it falls down the stack this may effect the result and will be discussed, but for now it is assumed that all coins will fall on edge the whose way. When the coin 50 strikes the stack 64 it will produce a sound that is picked up by the coin sensor or transducer or microphone 22. By knowing the entry velocity and the time thereafter it takes to sense when the coin strikes the stack 64, it is possible to calculate the height h (FIG. 3) and hence the height of the stack 64. Calculations or look up table data necessary to make this determination are stored in the microprocessor 14.

The equation for calculating the distance h is: $h=(\frac{1}{2})gt=V_0t$, where g represents the constant for acceleration due to gravity of a free falling body, or 9.8 $m/sec^2$, t is the time it takes for the coin 50 to move from the coin tube entry until it strikes the stack 64, and $V_o$ is the entry coin velocity. If the entry velocity $V_o$ is assumed to be zero, and the time t is found to be 0.140 seconds then $h=\frac{1}{2}(9.8)(0.140^2)=96.04$ mm. If the length of the dime coin tube 42 is 140 mm then the height of the stack 64 of dimes is equal to 140–96.04 mm or 43.96 mm. If the thickness of each dime coin in the stack is 1.7 mm then there were 26 coins in the stack 64 and now there are 27. In this way the number of coins in the coin tube can be determined and this can be done without knowing how many coins have been fed into the coin tube or how many have been dispensed therefrom.

In the usual situation the number of coins indicated in a coin tube by the present device will depend on the input velocity $V_o$ of each coin as it enters the tube. For example, if a coin s input velocity $V_o$ as determined by the photocell 26 (FIG. 1) is faster for one coin than for another of the same type, the equation for calculating h or a look up table, if not corrected for $V_o$, will indicate fewer coins in the coin tube because at the greater input velocity it will take less time for the faster coin to fall far enough to strike the stack of coins. The present control device includes means for adjusting for coin input velocity $V_o$.

Figure 4:
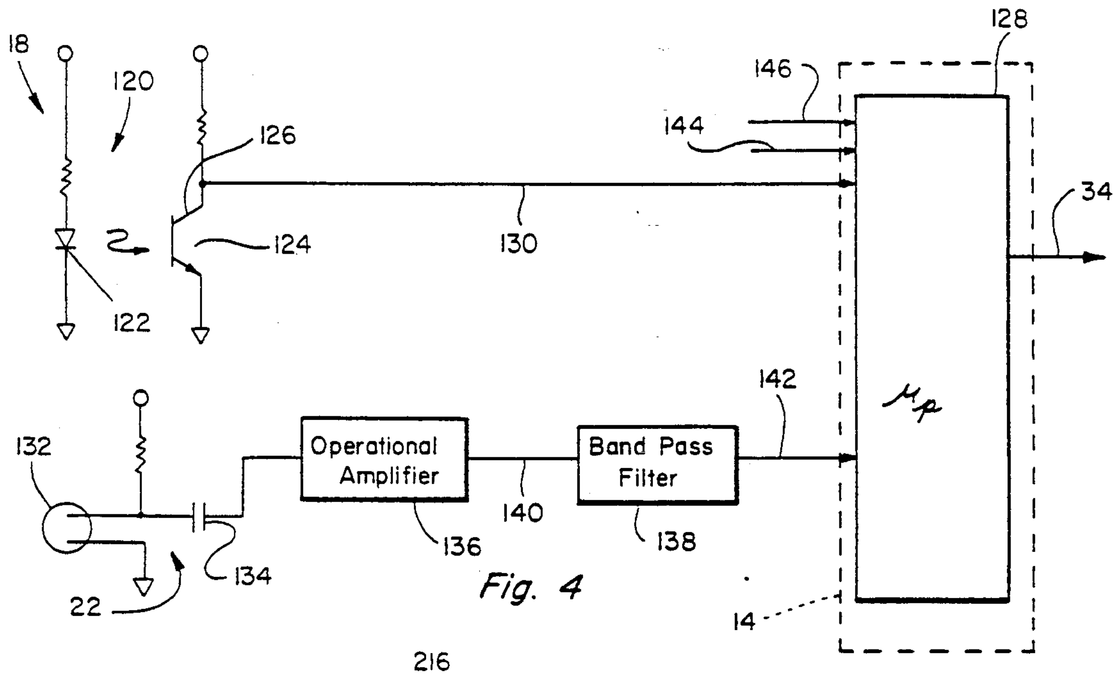
FIG. 4 is a schematic circuit diagram partly in block form of the coin tube monitor and control means of the present invention.

Referring to FIG. 4, a schematic diagram partially in block form of the coin tube monitor and control means is shown. The optical coin sensor 18 is shown including an optical coupler 120 that includes light emitting diode (LED) 122 and photo-transistor 124. The LED 122 and photo-transistor 124 are positioned respectively on opposite sides of the opening 44 into the quarter coin tube 38, to detect the passing of each quarter coin 50 therethrough or thereby. The collector 126 of the photo-transistor 124 is connected to microprocessor 128 via lead 130. The microprocessor 128 may be included in the payout control means 14. When a coin 50 passes between the LED 122 and the photo-transistor 124 it interrupts the light passage therebetween and this causes the photo-transistor 124 to change from a conducting to a non-conducting condition. This change in conductivity causes an entry to be made into the microprocessor 128 over lead 130. Thereafter when the coin 50 (having a known diameter 0.955") has completely passed from between the elements 122 and 124 the photo-transistor 124 will again receive light and conduct and the microprocessor 128 can then determine or calculate the entry velocity $V_o$ of the coin from the commencing to the termination of the non-conducting condition of the photo-transistor 124. A magnetic circuit could be used in place of the LED 122 and the photo-transistor 124.

The acoustical coin sensor 22 includes a sound responsive transducer 132 which is biased into an operating condition and coupled by capacitor 134 to the input of operational amplifier 136. The output of the operational amplifier 136 is connected to a band pass filter 138 via lead 140. The band pass filter 138 is constructed to pass only signals produced by the amplifier due to sounds detected when a coin impacts such as on a stack of coins in one of the coin tubes 38, 40, and 42. The outputs of the band pas filter 138 are fed on input lead 142 to the microprocessor 128. The microprocessor 128 also receives inputs from the optical detectors associated with each of the coin tubes on leads 130, 144 and 146 as stated. The lead 144 is connected with the optical coupler associated with the opening 46 of the nickel coin tube 40 and the lead 146 is connected to the optical coupler associated with the opening 48 into the dime coin tube 42.

The microprocessor 128 processes the data produced during passage of the coin 50 through the optical coupler 120 and the signals produced by the noise senses when the coin impacts the stack 60, 62, or 64 and determines by stored look up table data the number of coins that are in the various stacks. This information is also used to compare with the established predetermined maximum and minimum numbers of coins stored in memory and used to determine whether change can be made from particular coin tubes. Also, this information can be used for maintaining a record count of the number of coins in the tubes and the numbers sent to the cash box for management control. If the number of coins in a coin tube reaches or exceeds the predetermined maximum, the microprocessor 128 thereafter sends a signal over lead 34 to open gate B so that future deposited coins of that denomination will be delivered into the cash box 56 rather than to the coin tube.

Instead of calculating h, which is possible to do from the information received from the various sensors, the microprocessor 128 may have stored in its memory a table of predetermined values representing corresponding numbers of coins, each value of which is a function of the various times T2, T3, and T4. For example, if the coin tube 38 is five (5) inches in height and has a capacity for holding up to 77 quarters, various predetermined times T2 representing different numbers of quarters may be stored in a table. The time differences between the times T2 and T1 can then be used to identify by selection the number of quarters stored in the quarter coin tube 38. If the time difference between T2 and T1 (the leading edges of respective signals) is so many milliseconds, this time corresponds to a stored table reading for the situation such as where the quarter tube 38 has 25 quarter coins accumulated in it. This determination is made entirely based on the time it takes for a quarter coin to fall from the entrance of the coin tube until it strikes the stack of quarter coins contained therein. The time it takes for the noise produced by a coin striking a stack of coins to reach the sensors occurs at or near the speed of sound which is very much faster than the speed of movement of the coin falling in the coin tube. Therefore for practical purposes this short time can be ignored.

Figure 5:
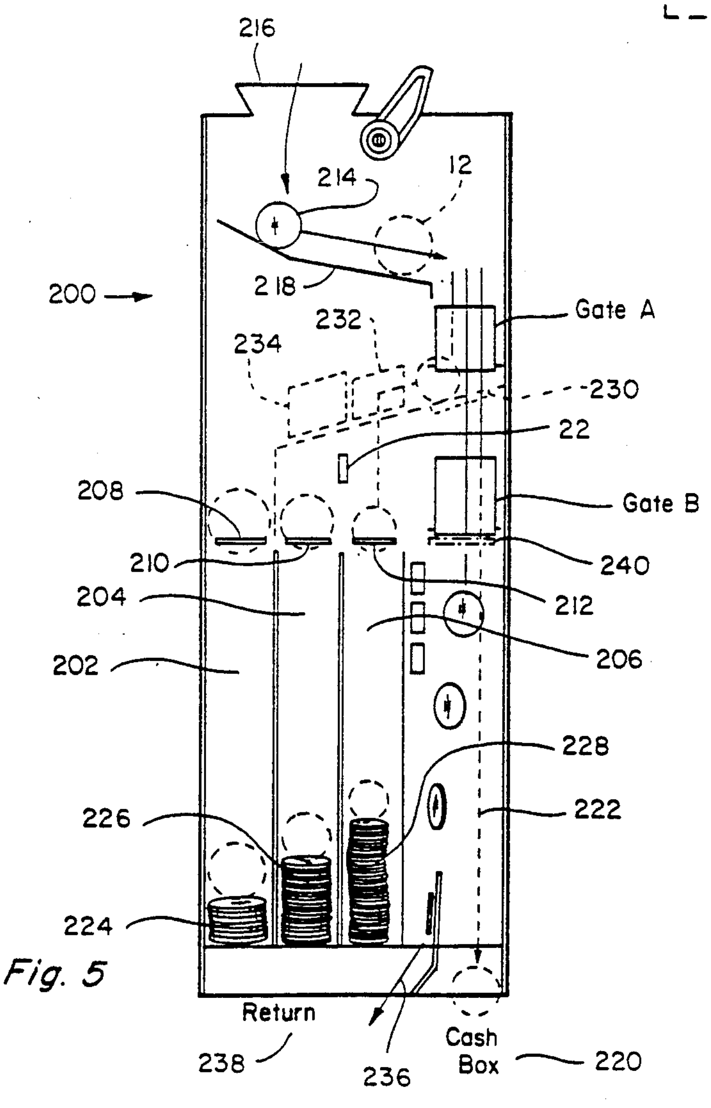
FIG. 5 is a perspective view of a set of coin tubes for use with a vending machine equipped with another embodiment of the present invention.

FIG. 5 shows another construction of coin changer 200 which includes a somewhat different embodiment of the present invention. The main difference between this embodiment and the embodiment 36 is that the embodiment 200 does not have anything that is equivalent to the coin sensor 18. The coin changer 200 is shown including quarter, nickel and dime coin tubes 202, 204, and 206 each have respective means or objects 208, 210, and 212 located at their respective upper ends against which coins impact. The objects 208, 210 and 212 then act to orient or direct coins as they enter into the respective coin tubes 202, 204, and 206. Each of the coin tubes 202, 204, and 206 also has means at its lower end operable by respective motors or solenoids to discharge one or more coins for payback or refund purposes.

A coin 214 is shown after being deposited at inlet 216 and as it is starting to roll down an incline 218 past coin sensing means such as the means 12. The coin sensing means 12 determines whether the deposited coin 214 is acceptable o genuine as aforesaid and what denomination it is. This information is sent to the payout control means or microprocessor 14. If the coin 214 is determined to be acceptable, the payout control means 14 then determines whether the coin 214 should be sent to the appropriate one of the coin tubes 202, 204, and 206 for that denomination or to the cash box 220. If the coin 214 is to be sent to one of the coin tubes 202, 204, and 206 a signal is sent over lead 32 (FIG. 1) to energize the gate A. If the payout control means 14 determines the coin 214 should be sent to the cash box 220 a signal is sent over lead 34 to energize the gate B in which case the coin 214 is directed along the path indicated by dotted arrow 222. Each of the coin tubes 202, 204, and 206 is shown containing a stack of coins which have been accumulated for subsequent payout or refund to a customer.

If it is determined by the microprocessor means 14 that the deposited coin 214 should be directed under control of the gate A, then the coin 214 moves along another inclined path 230 from which it can fall into the appropriate coin tube. The coin enters the appropriate coin tube inlet and falls by gravity therein until it strikes or impacts against the top coin in the stack of coins and in so doing produces an audible signal that is detected by the acoustic coin sensor 22. The detected noise is amplified and otherwise processed and is fed a an input to the payout control means 14. The time of the leading edge of this signal is important. It is also important as the coin falls off the incline 230 into the respective coin tube to record the time the coin enters the coin tube as aforesaid.

Each coin tube 202, 204 and 206 has its own means or object 208, 210 and 212 positioned to respond to a coin entering therein so that the time of entry produces a noise signal picked up by the acoustic sensor 22, the leading edge of which can be compared with the leading edge of the corresponding impact signal when the coin strikes the stack of coins in the tube. The time difference between these signals for each coin tube is then used to determine the number of coins in the respective stacks as described above.

When gate A is energized it is necessary to also deenergize or close it as soon as the accepted coin 214 has passed through to prevent a subsequent coin from entering before the payout control means 14 determines where the next coin should be directed. When gate B is operated and energized, it also must be deenergized and closed as soon as the accepted coin 214 has Passed to prevent the next coin from entering before the payout control means 14 determines where the next coin should go. This also applies to the coins that are to be directed along coin return path 236 to the coin return outlet 238. When the gate B is open and the coin 214 is directed to go to the cash box 220, such coin 21 will strike another object 240 before falling into the cash box 220. The sound produced by the coin 214 striking the object 240 will also be sensed by the sound sensor 22. In response to the coin sensor 22 detecting a coin 214 striking object 240 it will operate to close gate B.

Figure 6:
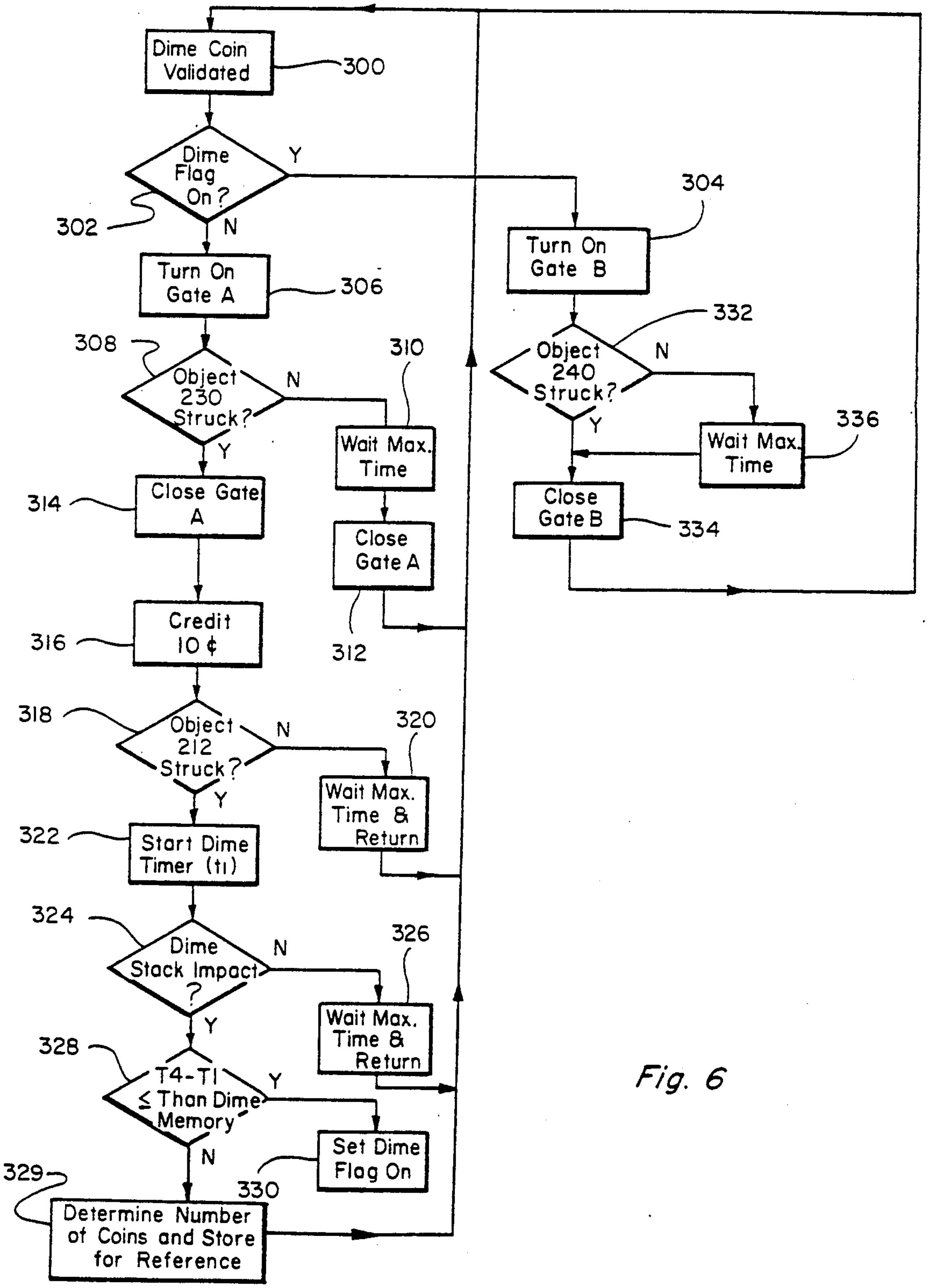
FIG. 6 is a flow chart diagram of the operation of a dime coin tube monitor and control for the embodiment shown in FIG. 5.

FIG. 6 shows a flow chart of the various sequences of events that occur in the device shown in FIG. 5 when it has been determined an acceptable or genuine dime coin has been deposited. Although the flow chart operations of the subject coin tube monitor means are only shown for the situation where a dime is deposited, it is to be understood that the operation of the monitor means for the deposit of other coin denominations will be similar. When a dime is deposited into the inlet 216, it is sensed by the coin sensing means 12 which determines its genuiness or acceptability and its denomination. If the deposited coin is validated to be a dime in step 300, the program will proceed to step 302 labeled DIME FLAG ON. In step 302, if the Dime Flag is indicated ON, the control of the program branches to step 304 labeled TURN ON GATE B. This means that the dime coin tube 206 has accumulated in it a number of dime coins at least equal to a predetermined maximum number. Under these circumstances the deposited coin will need to be directed to the cash box 220. If DIME FLAG OFF is indicated, then the program proceeds to step 306 labeled TURN ON GATE A. In step 306 gate A is energized or opened to direct the coin 214 to strike the object or control surface 230, see step 308. The step 308 has two possible outputs one of which depends on the coin striking the object 230. If the object 230 is struck a Y (yes) output of step 308 will result and this will cause the Gate A to be closed (step 314). If the object 230 is not struck the N (no) output of step 30 will be activated to energize step 310 labeled WAIT MAX TIME. Step 310 will cause a predetermined time period to time out, and after the period has expired a signal will be produced to cause step 312 to be activated to close gate A. In other words gate A will be closed whether or not the object 230 is struck, but in one case the gate A will be closed promptly and will cause a dime credit to be entered by way of step 316 labeled CREDIT 10¢ and in the other case no credit will be entered and the output of step 312 will be fed back to step 300 in Preparation to respond to the succeeding coin.

After step 316 in the case of a dime coin has been actuated, the program will proceed to step 318 labeled OBJECT 212 STRUCK to determine whether another dime coin has struck the object 212. If it is not indicating a struck condition the N (no) condition will occur and will activate step 320 labeled WAIT MAX TIME AND RETURN. This means that the dime coin went to the cash box and not to the dime coin tube 206. When step 320 is activated it will time out a predetermined time period and return the operation to step 300 as in the case of step 312.

If in step 318 it is determined that the object 212 has been struck by the dime coin then the program continues to step 322 labeled START DIME TIMER (T1). The instant the coin strikes the object 212 it establishes the time T1, which unlike the earlier embodiment is sensed by the audio sensor 22 (FIGS. 1 and 2). The coin then falls by gravity down the tube 206 until it strikes or impacts the top coin in the stack of dime coins. When this happens another sound or noise signal is produced by the coin and this is also sensed by the audio sensor 22. The front or leading edge of this signal is the time T4 for a dime coin. The next program step is step 324 labeled DIME STACK IMPACT which step determines whether the dime stack 228 has been struck. If in 32 it is determined that the dime stack 228 has not been struck by the coin, the N (no) output will energize step 326 labeled WAIT MAX TIME AND RETURN, which like the other similar step 320, will cause a time out operation to take place and return the program to step 300.

If during step 324 it is determined that the coin has struck the dime stack 228 the Y (yes) output will cause step 328 labeled T4-T1 THAN DIME MEMORY to be actuated. In step 328 it is determined whether the time period represented by the length of time between times T1 and T4 (i.e. T4-T1) is less than or equal to a predetermined time period stored in memory to represent some preestablished number of dimes in the stack. If the time difference is equal to or less than the predetermined stored time, the Y (yes) output of the program will be actuated and step 330 labeled SET DIME FLAG ON will be actuated to indicate the predetermined time period. If said time is greater than a predetermined stored time, the N (no) output of step 328 will be active and the program will proceed to step 329 which determines and stores the number of coins in the stack. Such information can be used for coin acceptance and availability status and for determining coins available for payback, see in this regard Levasseur U.S. Pat. No. 4,763,769.

If, during DIME FLAG ON step 302 the control of the program is directed to step 304 instead of to step 306 the gate B will activated or opened to direct the coin along the course to impact object 240. The program then proceeds to step 332 labeled OBJECT 240 STRUCK. In step 332 it is determined whether the coin has struck object 240. If it has, the Y (yes) output energizes step 334 labeled CLOSE GATE B and the coin is allowed to proceed to be the cash box 220. At the same time the program will return to step 300. If during step 332 it is determined that the coin has not struck the object 240, then the N (no) output actuates step 336 labeled WAIT MAX TIME to cause a time out operation to take place, after which step 334 is energized to close gate B and to return control of the program to step 300.

A flow chart similar to the dime flow chart shown in FIG. 6 can be provided for the other coins and coin tubes that may be present such as for nickels, quarters, half dollars, and so forth. The device is also fully adaptable to be used with foreign coinage as well.

The circuitry for the subject device including the particular way in which the circuits are connected and operated can be varied considerably and the present means can be adapted to be used with existing vend control circuits such as those identified in the patents referred to above and with others with minimal structural and circuit modification or change. Also with the present device there is much less possibility for trouble in the coin tube portions of the device since the coin tubes for the most part are free of obstructions or sensors which could engage the coins and cause problems and require maintenance.

Thus there has been shown and described a novel means for monitoring and controlling the coinage in the coin tubes of a vending or other coin operated device, which monitoring and control means fulfill all of the objects and advantages sought therefor. It will be apparent to those skilled in the art, however, that many changes, variations, modifications, and other uses and applications are possible and all such which do not depart from the spirit and scope of the invention are deemed to be covered by the invention which is limited only by the claims which follow.

What is claimed is:

1. Coin tube monitor and control means for monitoring and controlling the number of coins in a coin tube having an input end and an output end oriented so that coins entering at the input end accumulate therein in a stack comprising:

means for producing a first signal at the time when a coin enters the coin tube, the leading edge of said first signal representing the time when the coin is considered to have entered the coin tube, an audible sound being produced at the time when the coin falling in the coin tube strikes the stack of coins that has accumulated therein means responsive to the audible sound for producing a second signal, the leading edge of said second signal representing the time the coin strikes the stack, electronic circuit means connected to the means for producing the first signal and to the means for producing second signal, said circuit means including means for establishing the time duration between the leading edges of the first and second signals, and look up table means for establishing the number of coins in the coin tube from the established time duration.

2. The coin tube monitor and control means of claim 1 wherein the means for producing the second signals include acoustic sensor means.

3. The coin tube monitor and control means of claim 1 wherein the means for producing the first and second signals includes acoustic sensor means.

4. The coin tube monitor and control means of claim 1 wherein the means for producing the first signal includes optical sensor means.

5. The coin tube monitor and control means of claim 1 wherein the means for producing the first signal includes magnetic sensor means.

6. The coin tube monitor and control means of claim 1 including a plurality of coin tubes each having means for producing respective first and second signals.

7. The coin tube monitor and control means of claim 6 wherein at least some of the plurality of coin tubes are for different denomination coins.

8. The coin tube monitor and control means of claim 1 wherein the means for establishing the number of coins in the coin tube from the established time duration includes means for taking into account the velocity of the coin as it enters the input end of the coin tube.

9. The coin tube monitor and control means of claim 1 including other circuit means operatively connected to the means for establishing the number of coins in the coin tube from the established time duration for updating the number of coins in the coin tube based on coins dispensed from the output end of the coin tube.

10. The coin tube monitor and control means of claim 1 including means associated with the coin tube for predeterminately directing coins away from the coin tube when the numbers of coins established by the means for establishing the number of coins exceeds a preselected number.

11. Coin tube monitor and control means for monitoring and controlling the number of coins in a coin tube having an upper input end into which coins enter the coin tube and a lower output end, wherein coins entering at the input end fall down the coin tube and accumulate therein in a stack, each coin as it strikes the stack of coins accumulated in the coin tube producing a sound comprising:

means for sensing a coin entering the coin tube at the input end including means for producing a first signal, the time of occurrence of which represents the time of entry of a coin therein;

means acoustically coupled to the coin tube responsive to the sound produced by a coin striking the stack of coins that has accumulated therein, said acoustically coupled means producing a second signal, the time of occurrence of which represents the time of the coin striking the stack of coins; and means for determining from a relationship between the time of occurrences of the first and second signals the number of coins in the coin tube.

12. Coin tube monitor means for monitoring the number of coins in a coin tube having an input end where coins enter and an output end where coins accumulate in the tube in a stack, each coin producing a sound when it strikes the stack of coins in the coin tube, the coin tube monitor means comprising:

means for sensing a coin at the time it enters the coin tube and for producing a first signal representative thereof;

acoustic means for sensing the sound produced when the falling coin in the coin tube strikes the stack of coins that has accumulated in the coin tube and for producing a second signal representative thereof; and means for determining from the difference in the time of occurrences of the first and second signals the number of coins in the coin tube.

13. Coin tube monitor means for monitoring the number of coins in a coin tube, the coin tube having an input end where coins enter and an output end where coins accumulate in a stack therein, each coin entering the coin tube falling down the coin tube and producing a sound when it strikes the stack of coins therein, the coin tube monitor means comprising:

means for sensing the time when a coin enters the coin tube and for producing a first signal representative of the time of occurrence thereof;

means responsive to the sound produced when the coin falling down the coin tube strikes the stack of coins therein and for producing a second signal representative of the time of occurrence thereof;

storage means including means for storing data representative of different time differences between the times of occurrences of the first and second signals, the stored time differences representing different distinct numbers of coins in the coin tube, and means for comparing the difference in the times of occurrence of the first and second signals with the stored data to determine the number of coins in the coin tube.

14. Means to keep a running total of the number of coins in a coin tube having an input end at which coins enter the coin tube and an output end at which coins accumulate in a stack therein comprising means for producing a first signal each time a coin enters the input end of the coin tube, each coin entering the coin tube falling down the coin tube and striking the stack of coins therein producing an audible noise, means responsive to the audible noise for producing a second signal, and means for determining the number of coins in the coin tube based upon the time interval between the time of occurrence of the first and second signals.

15. The means of claim 14 including means to limit the acoustical response of the second signal to a frequency range that includes the frequency of the coin's vibration when striking the stack of coins.

16. The means of claim 14 including inductive means located adjacent to the input end of the coin tube, the first signal being produced by a change in the inductive means when a coin moves adjacent thereto.

17. The means of claim 14 wherein the means for determining the number of coins in the coin tube include means for taking into account the velocity of the coin as it enters the input end of the coin tube.

18. The means of claim 17 including sensor means located adjacent to the input end of the coin tube, the input velocity of a coin being determined by the time required for the coin to pass the sensor means.

19. The means of claim 14 including circuit means operatively connected to the means for determining the number of coins in the coin tube for updating the number of coins in the coin tube based on coins dispensed from the output end of the coin tube.

20. The means of claim 14 including means associated with the coin tube for predeterminately directing coins away from the coin tube when the number of coins determined by the means for determining the number of coins exceeds a preselected number.

21. The means of claim 14 including acoustical sensor means located upstream of the input end of the coin tube to sense the passage of coins and gate means under control thereof to control the movements of subsequent coins thereby.

22. The means of claim 14 wherein the means for producing the first signal include optical sensor means.

23. The means of claim 14 including a plurality of coin tubes each having means for producing respective first and second signals.

24. The means of claim 14 including means to provide coin availability status for determining coin availability for making payback of change.

25. The means of claim 24 including means to produce a display indicating the number of the coins in the coin tube.

26. The means of claim 14 including means to store a coin count of the number of coins in the coin tube for reference purposes.

* * * * *

UNITED STATES PATENT AND TRADEMARK OFFICE

CERTIFICATE OF CORRECTION

PATENT NO. : 5,092,816

DATED : March 3, 1992

INVENTOR(S) : Joseph L. Levasseur

It is certified that error appears in the above-identified patent and that said Letters Patent is hereby corrected as shown below:

Column 1, line 63, "store" should be --stored--.

Column 5, line 37, "t" should be --to--.

Column 5, line 57, "mean" should be --means--.

Column 6, line 16, "Present" should be -present--.

Column 6, line 55, "whose" should be --whole--.

Column 6, line 65, "$h=(1/2)\ gt=V_0t$" should be --$h=(1/2)\ gt^2+V_0t$--.

Column 7, line 60, "pas" should be --pass--.

Column 8, line 65, "o" should be --or--.

Column 9, line 23, "a" should be --as--.

Column 9, line 45, " Passed" should be --passed--.

Column 9, line 51, "21" should be --214--.

Signed and Sealed this

Fourth Day of May, 1993

*Attest:*

Michael K. Kirk

MICHAEL K. KIRK

*Attesting Officer* *Acting Commissioner of Patents and Trademarks*